United States Patent [19]
Ohlig

[11] Patent Number: 6,157,441
[45] Date of Patent: Dec. 5, 2000

[54] FILM ON GLASS IMAGING FIXTURES AND METHOD

[75] Inventor: Albert H. Ohlig, Newport Beach, Calif.

[73] Assignee: Olec Corporation, Irvine, Calif.

[21] Appl. No.: 09/267,226

[22] Filed: Mar. 11, 1999

[51] Int. Cl.[7] .................................................. G03B 27/20
[52] U.S. Cl. ................................ 355/91; 355/76; 355/94
[58] Field of Search .................... 355/76, 91, 92, 355/93, 94, 73; 430/5

[56] References Cited

U.S. PATENT DOCUMENTS

| | | | |
|---|---|---|---|
| 4,032,233 | 6/1977 | Oscarsson et al. | 355/91 |
| 4,827,316 | 5/1989 | Brown | 355/91 |
| 4,888,488 | 12/1989 | Miyaka | 355/91 |
| 5,160,959 | 11/1992 | Everett et al. | 355/91 |
| 5,272,502 | 12/1993 | Saiki | 355/91 |
| 5,298,940 | 3/1994 | Ohlig | 355/91 |
| 5,403,684 | 4/1995 | Schroeder et al. | 430/5 |
| 5,477,311 | 12/1995 | Tiltey | 355/91 |

*Primary Examiner*—Alan A. Mathews
*Attorney, Agent, or Firm*—Fenwick & West LLP

[57] ABSTRACT

Apparatus and method for supporting master image sheets on supporting platens includes forming vacuum seals between sheets and platens and evacuating air from therebetween to retain the master image sheets against movements on the supporting platens. An image receiving layer such as a photosensitive printed circuit board is disposed between supporting platens that are, then evacuated to retain the opposite surfaces of the layer in contact with the master image sheets for parallax-free photographic exposure to light through the platens, with inherent alignment of images thus formed on the opposite surfaces of the layer.

14 Claims, 4 Drawing Sheets

FILM ON GLASS IMAGING FIXTURES AND METHOD

FIELD OF THE INVENTION

This invention relates to fixtures for supporting master-image films on glass, and more particularly to method and apparatus for evacuating residual volumes of air from between film and glass through channels and vacuum seals formed between the master film and a supporting glass platen.

BACKGROUND OF THE INVENTION

Current trends toward smaller electronics products at lower costs and with greater performance capabilities are imposing greater precision requirements on the size and density of printed circuit boards. Smaller circuit boards with more densely packed circuitry requires greater positional accuracy and more accurate registration of master images on opposite sides of circuit boards. In addition, high speed production and low unit cost per circuit board are important considerations for producing low-cost products incorporating such circuit boards.

Circuit images that are produced photographically on circuit board substrates commonly originate from a master-image film that is preferably supported on, or is transferred to, a glass platen to prolong the life of the master images, and to accommodate higher-speed manual or automated production and greater precision of image registrations. Currently, glass platens 9 for supporting master-image films 12 include a peripheral surface groove 5, as illustrated in the plan view of FIG. 1, that serves as a vacuum channel 23 to assist in evacuating residual volumes of air from between the film 12 and glass platen 9, as illustrated in the cross-sectional view of FIG. 2. Glass platens 9 thus supporting master-image films 12 may be positioned in film-to-film registration on opposite surfaces of a circuit board panel 11, as illustrated in FIG. 3, within a vacuum system 23, 25, 27, 29 that promotes evacuation of residual air from between films 12, 13 and associated glass platens 9, 10 and from between films 12, 13 and circuit board panel 11. Master-image films 12, 13 thus positioned facilitate exposure of photosensitive layers on both sides of a circuit board panel 11 to sources of light in conventional manner to imprint the master images on respective sides of the panel 11.

Such conventional vacuum systems involving the associated glass platens 9, 10 for supporting the master-image films 12, 13 have several disadvantages. The peripheral groove 5 in each glass platen is commonly made narrow to inhibit pulling in and distorting of the master film 12, 13. This limits the surface area over which pressure differential can exert holding force on the film 12, 13 against the platen 9, 10 and light holding force of slippery film against slippery glass is conducive to shifting of the film on the glass with concomitant misalignments and registration problems. In addition, the dimensions of the film 12, 13 must extend critically beyond the peripheral groove in the glass platen to inhibit air leakage due to insufficient extension, and to inhibit peeling separation of the film 12, 13 from the glass platen 9, 10 due to excessive extension. Also, the resultant edges of the groove 5 at the surface of the glass platen form both undesirable and desirable seals against the film, as illustrated in FIGS. 4 and 5. Although a seal 4 formed between the film 12, 13 and outer edge of the peripheral groove 5, as illustrated in FIG. 4, is desirable to promote evacuation of residual air from between the film 12, 13 and glass platen 9, 10 over the expansive area surrounded by the peripheral groove 5, a seal 6 formed between the film 12, 13 and inner edge of the peripheral groove 5, as illustrated in FIG. 5 inhibits such evacuation and is undesirable. Also, leakage between the film 12, 13 and glass platen 9, 10 anywhere around the peripheral groove 5 is conducive to releasing the film 12, 13 for movement relative to the glass platen 9, 10. Further, vacuum seals thus formed between glass platen and master-image film are vulnerable to failure with associated loss of positional registration of the film on the platen due to variations in vacuum levels between film and platen relative to vacuum levels between platens, as later described herein, that can overcome the holding force of the vacuum between the film and platen. Multiple, spaced parallel grooves 5, as illustrated in FIG. 6, have been used to overcome some of the aforementioned disadvantages, but with only marginally improved performance and additional complexity and greater required surface areas of films 12 and platens 9.

SUMMARY OF THE INVENTION

In accordance with illustrated embodiments of the present invention, reliable seals between master-image film and a supporting glass platen are formed about the periphery of a master film at and about a peripheral vacuum groove in the surface of the glass platen. An insert of sealing material within the vacuum channel forms an improved seal between the film and platen. The insert is selectively anchored within the peripheral vacuum groove to inhibit movement thereof with the supported film, and the peripheral groove is selectively shaped to facilitate removal of residual volumes of air between film and platen.

DESCRIPTION OF THE INVENTION

Figure 1:
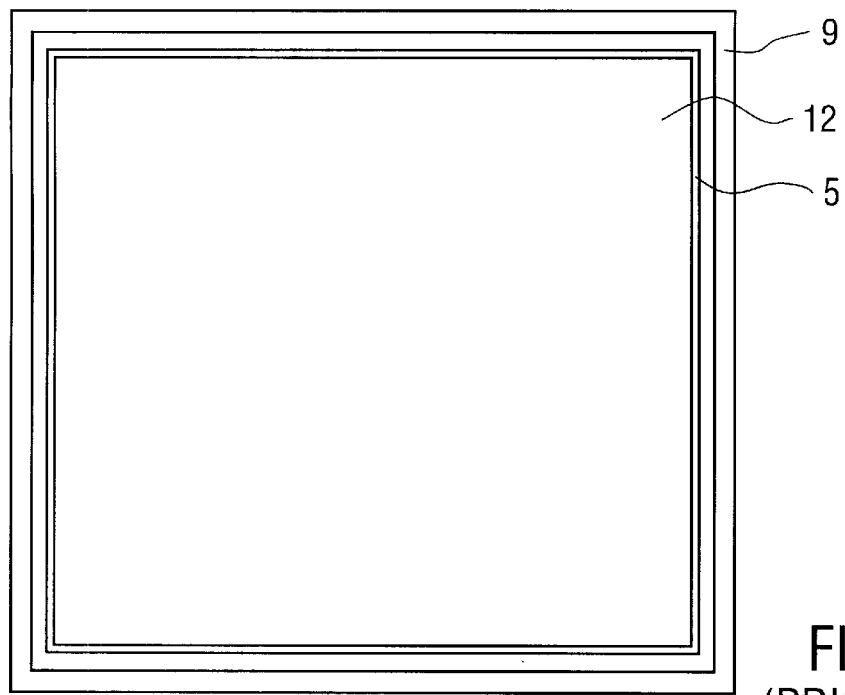
FIG. 1 is a plan view of a conventional platen and master-image film assembly.
Figure 2:
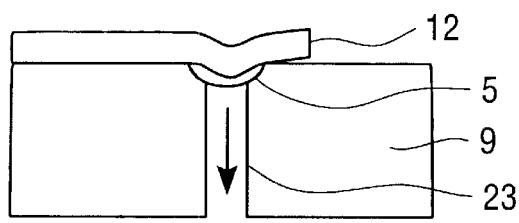
FIG. 2 is a partial sectional view of a conventional seal formed between master-image film and vacuum groove.
Figure 3:
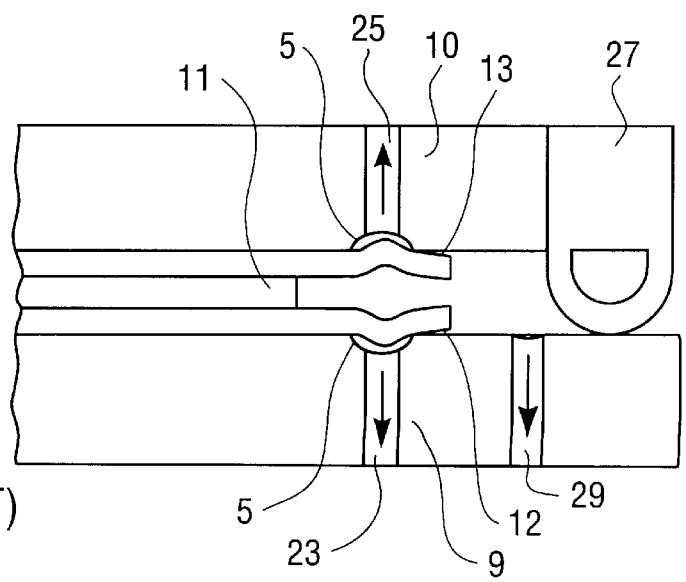
FIG. 3 is a partial sectional view of a conventional assembly of platens and master-image films on opposite sides of a circuit board panel.
Figure 4:
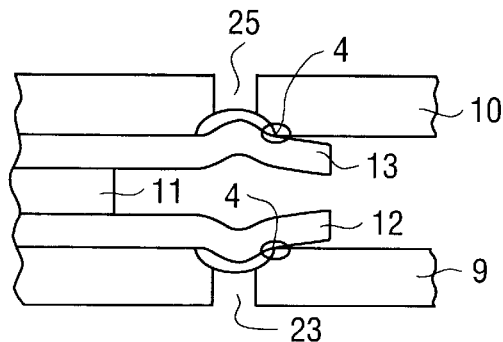
FIGS. 4 and 5 are partial sectional views of vacuum seals formed in conventional manner between master-image film and vacuum grooves.
Figure 5:
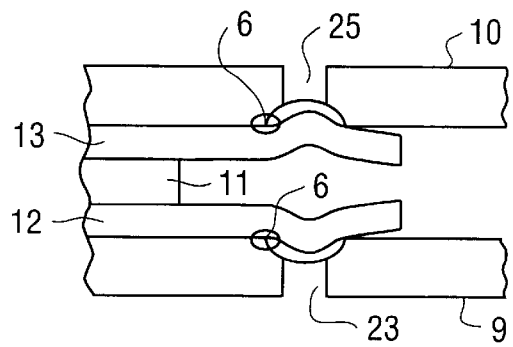
Figure 6:
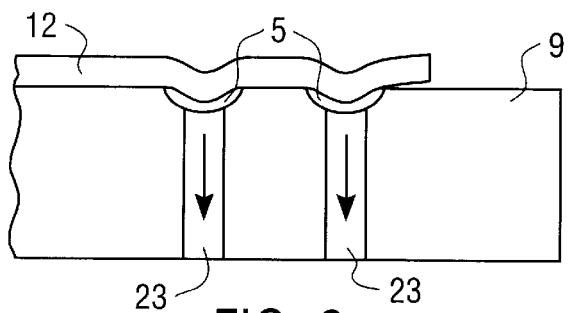
FIG. 6 is a partial sectional view of multiple vacuum seals formed in conventional manner between master-image film and supporting platen.
Figure 7:
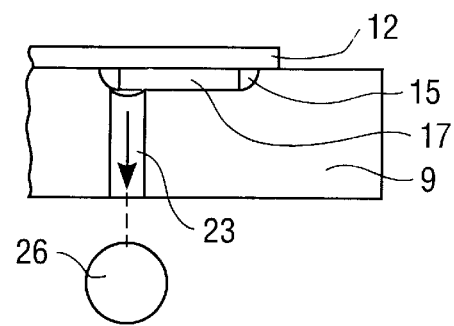
FIG. 7 is a partial sectional view of a vacuum seal formed between master-image film and supporting platen in accordance with one embodiment of the present invention.

Referring now to FIG. 7, there is shown a partial sectional view of a segment of the glass platen 9 including a vacuum groove 15 that may substantially surround the area of the glass platen within which the master-image film 12 is to be positioned. The groove 15 is sufficiently widened relative to conventional vacuum grooves 5 to facilitate placement of a sealing member 17 therein in reasonably flat, substantially planar elevation relative to the film-contacting surface of the glass platen 9. Master-image film (or thin glass layer) 12 positioned on the platen 9 and over the groove 15 with sealing member 17 therein is thus minimally distorted (or stressed) while forming a peripheral seal. Vacuum conduits 23 may connect a vacuum source 26 with the recess of the groove 15 at one or more spaced locations therealong for selectively evacuating residual air from between the film 12 platen 9.

Figure 8:
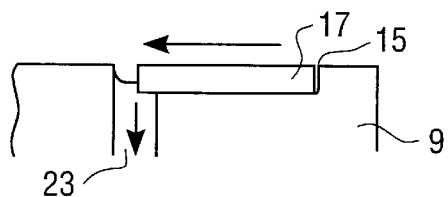
FIG. 8 is a partial sectional view of a seal-forming configuration according to the present invention.
Figure 9:
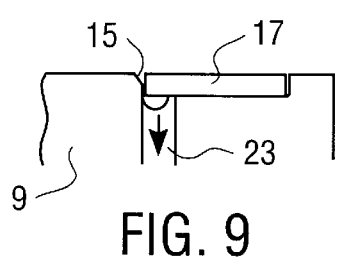
FIG. 9 is another partial sectional view of a seal-forming configuration according to the present invention.

In addition, the sealing member 17 may be formed of resilient plastic material such as ISO DAMP (proprietary polymeric material commercially available from ALL SEALS of Santa Ana, Calif.) which exhibits characteristic non-adhesive surface tackiness at least relative to the material (e.g., polyester) of the master-image film 12 to further promote stable positioning of the film 12 on the platen 9. Alternatively, other suitable resilient gasket material may be used to promote good vacuum seal between the master-image film and the platen 9. Such gasket material forming sealing member 17 may be disposed within the groove 15 as a length of tape, or may be cast within the groove 15, with specific abutment of interior-facing edges firmly anchored as with adhesive or cast in place against interior-oriented edges of the groove 15, as illustrated in FIGS. 8, 9. Such positioning of the sealing member 17 within the vacuum groove 15 inhibits possible movement of the film 12 and sealing member 17 within the groove 15, and therefore inhibits movement of the film 12 relative to the glass platen 9.

Figure 10:
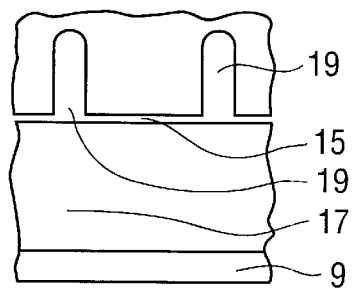
FIG. 10 is a partial top view of the vacuum groove and sealing member in a platen according to one embodiment of the present invention.
Figure 11:
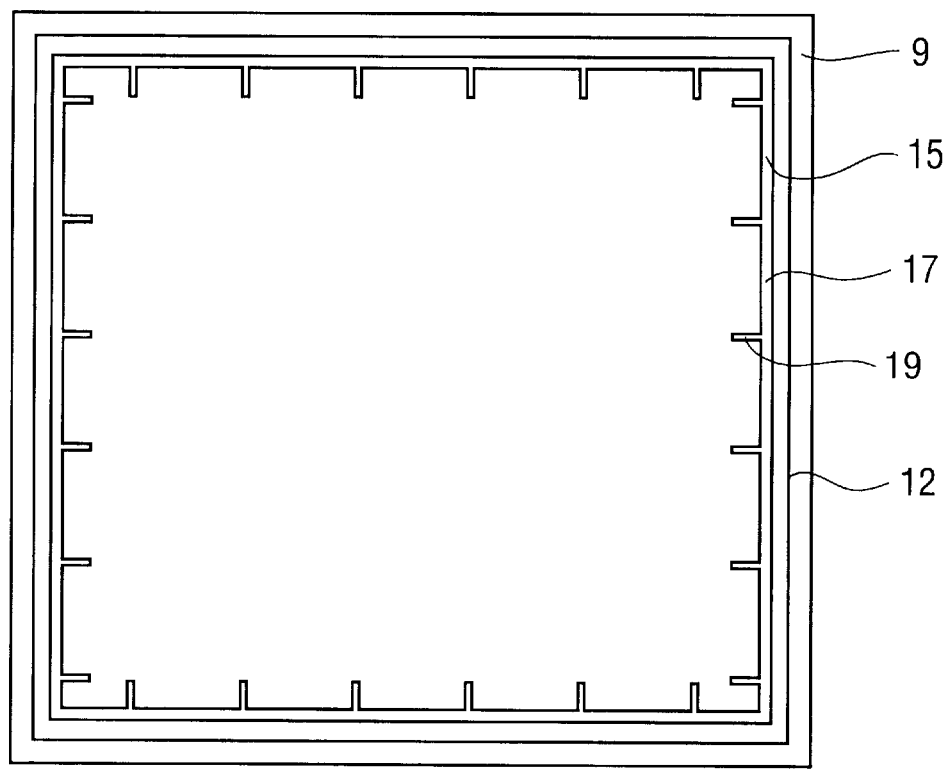
FIG. 11 is a top view of the embodiment of the present invention illustrated in FIG. 10.
Figure 12:
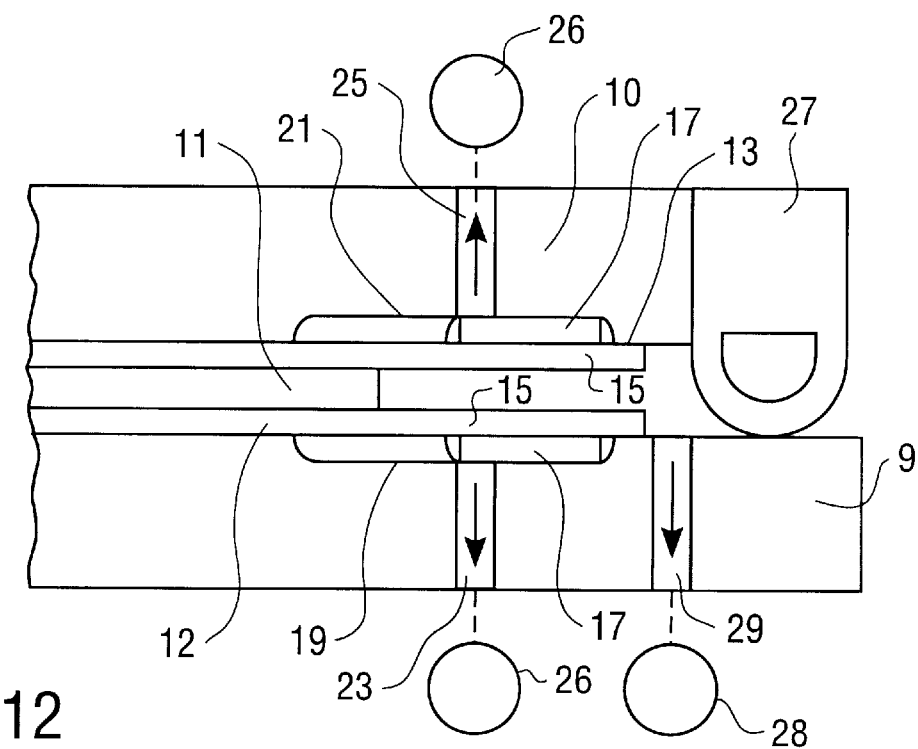
FIG. 12 is a partial side sectional view of an assembly panel of platens, master-image films and circuit board in accordance with one embodiment of the present invention.

Referring now to FIG. 8, there is shown a partial sectional view of an embodiment of the invention in which the vacuum conduits are disposed near interior-oriented edges of the groove 15, with the interior-facing edge of the sealing member 17 abutting a corresponding interior-oriented edge such as a step recess in the groove 15 to inhibit motion of a master-image film in contact therewith. A vacuum seal thus formed between an overlaying film and the sealing member 17 thus promotes removal of residual air from the interior regions between such film and the glass platen 9. An alternative embodiment, as shown in the partial sectional and top views of FIGS. 9 and 10, respectively, includes the sealing member 17 within a recessed vacuum groove 15 that includes a chamfered interior-oriented edge to promote removal of residual air from between an overlaying film and the glass platen 9. Laterally-oriented recesses 19 in the platen may communicate with the vacuum groove 15 to enhance the rapid removal of residual air from between film and platen. Thus, as shown in the top view of FIG. 11, a perimeter sealing member 17 within the vacuum groove 15, with lateral interior-extending recesses 19 communicating therewith, form an air-tight seal between an overlaying film and the glass platen 9 and form a network of vacuum channels for rapid removal of residual air from within the area surrounded by the perimeter seal between film and platen. A partial cross-sectional view of the assembly of platens, films, seals, and circuit board panel 11 is illustrated in FIG. 12 in which lower and upper glass platens 9, 10 are mounted in conventional manner for relative movement apart to permit introduction therebetween of a circuit board panel 11 and to retain relative alignment of the circuitry images carried by the master-image films 12, 13 attached to respective ones of the platens 9, 10. Each of the platens 9, 10 includes a vacuum groove 15 that extends entirely or partly about the periphery of the platen, and includes therein a sealing member 17 that is positioned with an exposed surface at an elevation that is substantially co-planar with the surface of the platen 9, 10 in contact with the film 12, 13. An upper, interior-oriented edge of the vacuum groove 15 may be chamfered to promote removal of residual air from between film 12, 13 and platen 9, 10, and lateral interior-extending recesses 19, 21 in the surfaces of the platens 9, 10 may also communicate with the vacuum grooves 15 to facilitate removal of the residual air. One or more vacuum conduits 23, 25 connected at selected locations in the vacuum grooves 15 to vacuum source(s) 26 facilitate removal of the residual air from the area within the peripheral seal between the film 12, 13 and member 17. The resulting pressure differential across the film thus maintains attachment of the film 12, 13 to the respective platen 9, 10. In addition, an outer vacuum seal 27 is positioned to form a peripheral seal between platens 9, 10 exteriorly of the seals formed between film 12, 13 and platen 9, 10, and the enclosed region is connected via a vacuum conduit 29 to a vacuum source 28 that provides less pressure differential than is provided by the vacuum source(s) 26 connected to the conduits 21, 23. This assures that the pressure differential established by vacuum sources 26 is not overridden by the pressure differential established by vacuum source 28 which might otherwise loosen and detach the film 12, 13 from the associated platen 9, 10. Of course, other conventional techniques such as weighting or spring biasing of the upper platen 10 against the lower platen 9 also useful for retaining the sandwiched assembly of platens, films, and circuit board panel in fixed registration during photoprocessing of the master images on the films 12, 13 onto the opposite surfaces of the circuit board panel 11 in conventional manner.

Figure 13:
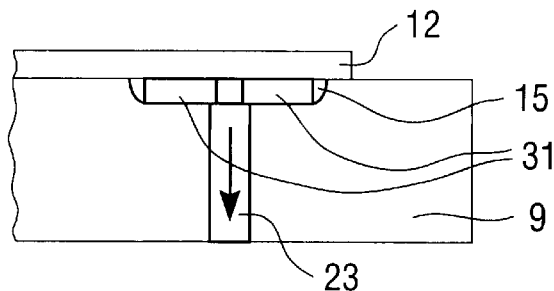
FIG. 13 is a partial side sectional view of an alternative embodiment of the sealing member according to the present invention.

Referring now to FIG. 13 there is shown a partial sectional view of another embodiment of the sealing member 31 within a vacuum groove 15 of a platen 9, in which the exposed surface of the member 31 is substantially co-planar with the film-supporting of the platen 9, and is split or scored deeply from the exposed surface to facilitate positioning of a sealing member on both edges of the vacuum conduit 23 into which the film 12 is drawn.

Figure 14:
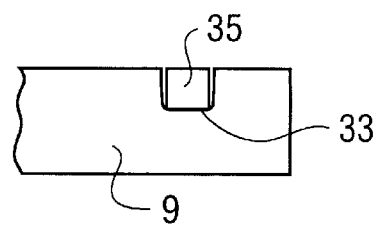
FIG. 14 is a partial sectional view of a sealing member according to the present invention.
Figure 15:
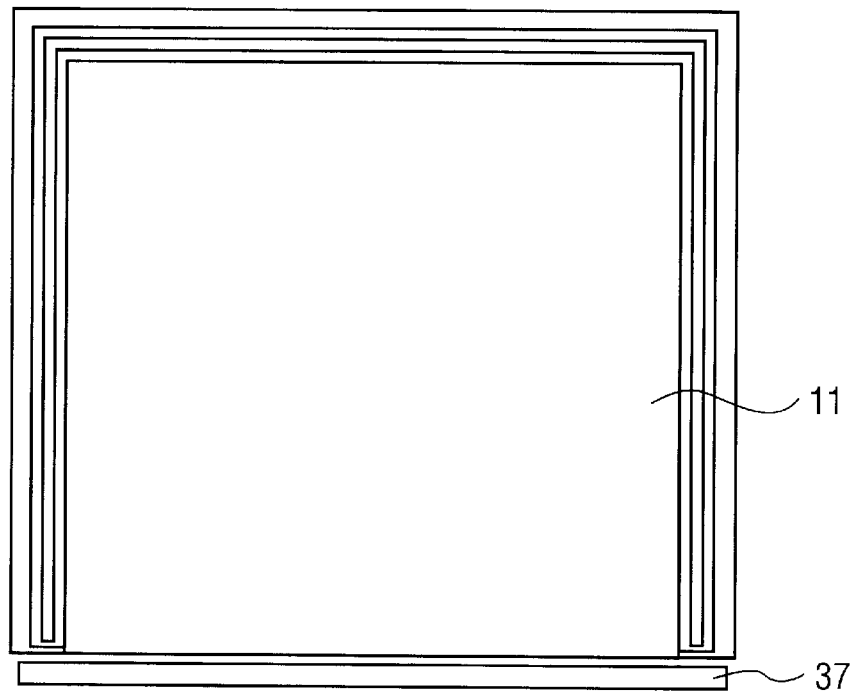
FIG. 15 is a top view of another embodiment of the present invention including a partially surrounding vacuum groove.
Figure 16:
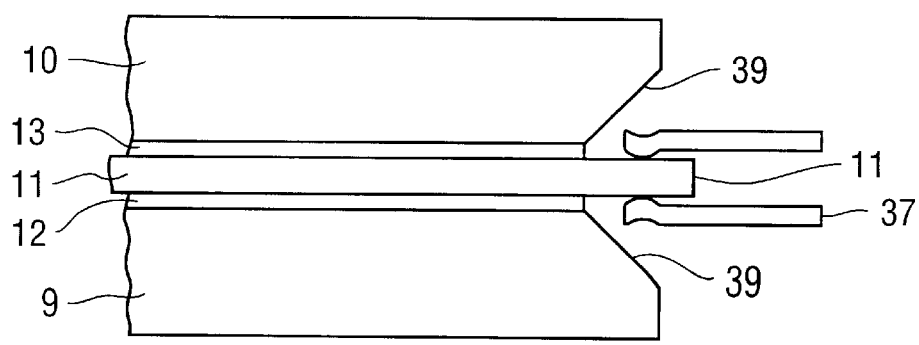
FIG. 16 is a partial side sectional view of a panel-gripping assembly according to one embodiment of the present invention.

With reference to the partial sectional view of FIG. 14, there is shown one embodiment of a vacuum seal formed at a location on the platen 9 at which a vacuum seal is required, for example, to complete an open segment of an enclosing periphery about a master-image film. This vacuum seal may be formed within a groove or recess 33 within the film-supporting surface of the platen, with gasket material 35 such as ISO DAMP, as previously referenced, disposed as a tape or as cast material within the recess 33 with the exposed surface positioned at an elevation that is substantially co-planar with the film-supporting surface of the platen 9. Such seal may be formed, for example, near a lower edge of a platen, as illustrated in the plan view of FIG. 15. In this embodiment, a circuit board panel 11 is selectively positioned along 3 orthogonal axes via a clamping mechanism 37 and associated actuators (not shown) that grip the panel 11 along the corresponding lower edge. Such mechanical gripping of a circuit board panel 11, as illustrated in the partial sectional view of FIG. 16, for positional manipulation is preferred over tooling holes conventionally included in circuit board panels to form the mechanical links needed for positioning a panel 11 on a platen. Such tooling holes commonly occupy area on the circuit board panel 11 that is unusable for printed circuitry, and simple coater mechanisms for applying liquid photoresist materials to the circuit board panel 11 commonly undesirably introduce such liquid material into the tooling holes. Also, the clamping mechanism 37 can conveniently accommodate circuit board panels 11 of widely varying dimensions without re-sizing or re-locating tooling holes for each size of circuit board panel 11 being photoprocessed. Additionally, such panel-clamping mechanism 37 may be contained within thickness dimensions not substantially greater than the thickness of the circuit board panel 11, and this permits simple and relatively inexpensive chamfering 39 of the facing, underside edges of the platens, as illustrated in FIG. 16, provide adequate space for operation of the clamping mechanism 37 onto and off the edge of the panel 11.

Therefore, the film-supporting and vacuum-sealing embodiments of the present invention greatly facilitate rigid and precision alignment of master-image films on opposite sides of circuit board panels during photoprocessing thereof, using low-cost components and simplified techniques that promote reliable and repeating operation.

I claim:

1. A vacuum hold down system for supporting a master image sheet, the system comprising:
    a supporting platen having a substantially planar surface for contacting a master image sheet, and including a recessed groove within the planar surface substantially surrounding a working area of the supporting platen;
    a vacuum conduit for connecting a source of vacuum to the recessed groove; and
    a sealing member disposed within the recessed groove with an upper surface thereof disposed substantially co-planarly with the planar surface of the platen for forming a vacuum seal with the master image sheet and being proximate to the vacuum conduit to promote removal to the source of vacuum of residual air between the platen and the master image sheet thereon.

2. The vacuum holk-down system according to claim 1 in which said recessed groove includes an abutment proximate the working area; and
    the sealing member is disposed within the recessed groove against the abutment to inhibit movement thereof enwardly toward the working area.

3. The vacuum hold-down system according to claim 1 including a plurality of channels disposed as recesses within the working area of the platen, each of said channels communicating with the recessed groove to promote removal of residual air to the source of vacuum from the working area between the platen and a master image sheet thereon via said channels and the vacuum conduit.

4. The vacuum hold-down system according to claim 3 in which the recessed groove is disposed substantially along orthogonal axes substantially about the working area, and each of the plurality of channels is oriented substantially perpendicularly to the recessed groove at the location therealong at which the channel communicates with the recessed groove.

5. The vacuum hold-down system according to claim 1 in which the sealing member is resilient for forming a vacuum seal with the master image sheet in contact therewith.

6. The vacuum hold-down system according to claim 1 in which the sealing member includes a flexible film for forming a vacuum seal with the master image sheet in contact therewith.

7. The vacuum hold-down system according to claim 1 in which the supporting platen is transparent for passing light therethough to the master image sheet.

8. A vacuum hold-down system including a pair of supporting platens according to claim 1 with working areas thereof in facing orientation; and
    an auxiliary sealing member disposed substantially about the working area remote from the recessed groove for forming a vacuum seal between the pair of supporting platens; and
    a conduit disposed remote from the recessed groove and within an area bounded by the auxiliary sealing member for communicating with an auxiliary source of vacuum to remove air from between the pair of supporting platens.

9. The vacuum hold-down system according to claim 8 in which an auxiliary source of vacuum provides a selected pressure differential across the auxiliary sealing member; and
    a source of vacuum provides a selected pressure differential across the sealing member within the recessed groove in each of the pair of supporting platens.

10. A method for supporting a master image sheet on a supporting platen carrying a sealing member thereon, the method comprising:
    forming a vacuum seal between the sealing member and a master image sheet in contact therewith that substantially surrounds a working area of the supporting platen;
    confining the sealing member against movement on the supporting platen toward the working area by disposing the sealing member within a recessed groove in the supporting platen;
    forming a vacuum conduit adjacent the sealing member and in the support platen carrying the sealing member and proximate the working area; and
    selectively evacuating air from within the working area between the supporting platen and the master image sheet in contact with the sealing member via the vacuum conduit for mounting the master image sheet on the supporting platen.

11. The method according to claim 10 for mounting master image sheets on each of a pair of supporting platens disposed with working areas in facing orientation, the method comprising:
    forming an auxiliary vacuum seal between the pair of supporting platens at locations remote from the sealing member on each of the supporting platens; and
    selectively evacuating air from between the pair of supporting platens within the auxiliary vacuum seal formed therebetween.

12. The method according to claim 11 including interposing an image-receiving layer between supporting platens substantially within the working areas of the pair of supporting platens; and
    the evacuation of air from between the pair of supporting platens engages the master image sheets in contact with opposite surfaces of the image-receiving layer.

13. A vacuum hold down system for supporting a master image sheet, the system comprising:

a supporting platen having a substantially planar surface for contacting a master image sheet, and including a plurality of lateral interior-extended recesses to enhance removal of residual air between the master image sheet and the supporting platen; and a vacuum conduit for connecting the plurality of lateral interior-extended recesses to a source of vacuum.

14. The vacuum hold down system according to claim 13, wherein the supporting platen includes a recessed groove within the planar surface substantially surrounding a working area of the supporting platen, the system further comprising:

a sealing member disposed within the recessed groove with an upper surface thereof disposed substantially co-planarly with the planar surface of the platen for forming a vacuum seal with the master image sheet, and being approximate to the vacuum conduit to promote removal to the source of vacuum of residual air between the supporting platen and the master image sheet thereon.

* * * * *

UNITED STATES PATENT AND TRADEMARK OFFICE
CERTIFICATE OF CORRECTION

PATENT NO. : 6,157,441
DATED : December 5, 2000
INVENTOR(S) : Albert H. Ohlig

It is certified that error appears in the above-identified patent and that said Letters Patent is hereby corrected as shown below:

In the abstract, Line 7 after "that are" delete the comma.

<u>Column 5, claim 2,</u>
Line 1, delete "holk-down" and replace with -- hold-down --.

<u>Column 5,</u>
Line 53, delete "enwardly" and replace with -- inwardly --.

Signed and Sealed this

Twenty-fifth Day of September, 2001

*Attest:*

NICHOLAS P. GODICI
*Attesting Officer*     Acting Director of the United States Patent and Trademark Office